(12) United States Patent
Mikhailov

(10) Patent No.: US 8,395,614 B2
(45) Date of Patent: Mar. 12, 2013

(54) GENERATING AN ASSET FOR INTERACTIVE ENTERTAINMENT USING DIGITAL IMAGE CAPTURE

(75) Inventor: Anton Mikhailov, Campbell, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 712 days.

(21) Appl. No.: 12/245,599

(22) Filed: Oct. 3, 2008

(65) Prior Publication Data

US 2009/0102835 A1 Apr. 23, 2009

Related U.S. Application Data

(60) Provisional application No. 60/980,640, filed on Oct. 17, 2007.

(51) Int. Cl.
*G06T 15/00* (2011.01)

(52) U.S. Cl. ........ 345/419; 345/619; 345/620; 345/621; 345/622; 345/623; 345/624; 345/473; 382/173

(58) Field of Classification Search ................... 345/419, 345/619–624, 473; 382/173
See application file for complete search history.

(56) References Cited

U.S. PATENT DOCUMENTS

| | | | |
|---|---|---|---|
| 5,050,222 A * | 9/1991 | Lee | 382/176 |
| 5,748,198 A * | 5/1998 | Takeda et al. | 345/441 |
| 5,805,168 A * | 9/1998 | Minakata | 345/427 |
| 5,838,830 A * | 11/1998 | Qian et al. | 382/243 |
| 6,229,546 B1 * | 5/2001 | Lancaster et al. | 345/419 |
| 6,295,066 B1 * | 9/2001 | Tanizaki et al. | 345/419 |
| 6,774,897 B2 * | 8/2004 | Moriwaki | 345/427 |
| 6,795,113 B1 * | 9/2004 | Jackson et al. | 348/207.1 |
| 7,058,224 B2 * | 6/2006 | Herley | 382/199 |
| 7,061,501 B1 * | 6/2006 | Lake et al. | 345/582 |
| 7,843,471 B2 * | 11/2010 | Doan et al. | 345/633 |
| 7,847,808 B2 * | 12/2010 | Cheng et al. | 345/634 |
| 2002/0018065 A1 * | 2/2002 | Tobita et al. | 345/427 |
| 2002/0067354 A1 * | 6/2002 | Oh et al. | 345/420 |
| 2006/0082571 A1 * | 4/2006 | McDaniel | 345/419 |
| 2006/0281511 A1 * | 12/2006 | Holm et al. | 463/9 |
| 2007/0071296 A1 * | 3/2007 | Nonaka et al. | 382/128 |
| 2007/0110298 A1 * | 5/2007 | Graepel et al. | 382/154 |
| 2008/0310707 A1 * | 12/2008 | Kansal et al. | 382/154 |
| 2009/0066690 A1 * | 3/2009 | Harrison | 345/419 |
| 2010/0092054 A1 * | 4/2010 | Hensley et al. | 382/128 |
| 2010/0110073 A1 * | 5/2010 | Abraham et al. | 345/420 |

FOREIGN PATENT DOCUMENTS

| | | |
|---|---|---|
| JP | 06-052305 | 2/1994 |
| JP | 2002-216148 | 8/2002 |
| JP | 2003-284868 | 10/2003 |

OTHER PUBLICATIONS

Japanese Office Action for Japanese Patent Application No. 2008-268431 dated Jul. 19, 2011.

* cited by examiner

*Primary Examiner* — Xiao M. Wu
*Assistant Examiner* — Todd Buttram
(74) *Attorney, Agent, or Firm* — Joshua D. Isenberg; JDI Patent

(57) ABSTRACT

Systems, methods and apparatus for generating an asset for a simulated environment using digital image capture are disclosed. An outline of an object in a digital image is automatically traced to generate data representing a two-dimensional polygon that encompasses the object. The outline is traced without relying on further input from a user once the digital image of the object has been captured. A portion of the digital image bounded by the two-dimensional polygon is separated from a remaining portion of the digital image. The portion of the image bounded by the two-dimensional polygon is associated with an asset in the simulated environment.

23 Claims, 13 Drawing Sheets

GENERATING AN ASSET FOR INTERACTIVE ENTERTAINMENT USING DIGITAL IMAGE CAPTURE

CLAIM OF PRIORITY

This application clams the benefit of priority of U.S. Provisional Patent Application No. 60/980,640, filed Oct. 17, 2007, the entire contents of which are incorporated herein by reference.

FIELD OF THE INVENTION

This invention is related to interactive entertainment and more particularly to generating an asset for interactive entertainment using digital image capture.

BACKGROUND OF THE INVENTION

The growth of the Internet and the popularity of interactive entertainment such as video games have led to opportunities for customization of assets within the context of video game programs and other programs for interactive entertainment. Video games allow a user to interact with a simulated terrain and other computer generated objects. Often, the user's interaction is by means of a computer generated symbol or character known as an avatar. Avatars and simulated terrain are often generated by software developers. There have been several attempts at customization of avatars and terrain features. These attempts are often limited by the capabilities of the interface controller that is used in conjunction with the game. Often, the interface has a few buttons and joysticks. These controls can be awkward to use for tasks such as drawing game characters or terrain features.

Recently, Microsoft Corporation developed an interface built around a digital camera. The camera captures a digital image of a scene and specialized software generates a height field from an analysis the digital image. Certain implementations use a depth sensing camera to capture depth information from the digital image.

The height field may then be used to generate terrain features for a video game. Unfortunately, this technique generates a single height field and thus cannot separate different objects from the image.

Another prior art interface uses a regular camera, and infers depth based on the shading of the image. Such an approach may construct a height field that is somehow correlated to the brightness of the image. For example, shadows would be low, while bright areas would be high. Another developer has used a depth camera to segment objects out of a scene and to insert synthetic objects into a real scene. This interface is described in detail at http://www.ee.ic.ac.uk/gelenbe/index_files/Games.pdf.

Unfortunately, cameras that detect depth information tend to be expensive and incorporating depth information into a simulated environment using such prior art techniques can be complicated.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
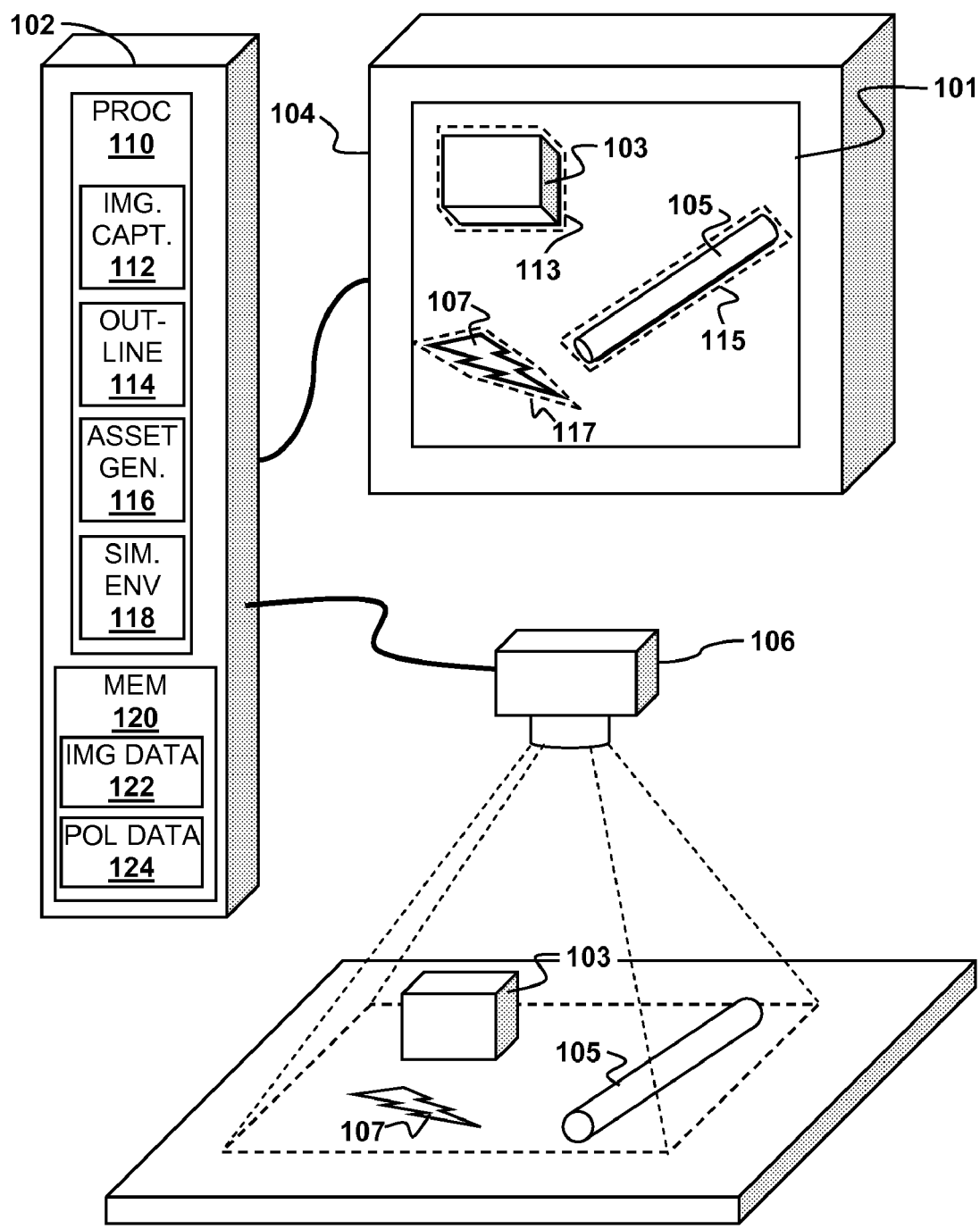
FIG. 1 is a three-dimensional diagram illustrating an example of a system configured to facilitate interaction with a simulated environment according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

As used herein, the term "simulated environment" refers to an environment represented by computer-readable data and instructions including associated rules of simulated physics that control interactions among different objects within the environment. Objects within the environment may include avatars, terrain features and other objects. Users interactions with the simulated environment may be represented on a video screen in the form of computer generated characters or objects referred to as avatars. The degree of interaction between the avatars and the simulated environment is implemented by one or more computer applications that govern such interactions as simulated physics, exchange of information between users, and the like. Examples of simulated environments include video games and virtual worlds. A video game is a simulated environment in which a user's interactions are in some way competitive. In a video game, a user may compete against one or more other users, or against a computer-generated opponent or against time to complete some task. In a virtual world, by contrast, a user primarily interacts with a simulated environment in a non-competitive manner for social, educational, or entertainment purposes. Examples of virtual worlds are described, e.g., in U.S. patent application Ser. Nos. 11/682,281, 11/682,284, 11/682,287, 11/682,292, 11/682,298, and 11/682,299, the contents of all of which are incorporated herein by reference. It is noted that there may be some overlap between video games and virtual worlds. Specifically, certain video games may include educational, social or entertainment aspects in addition to competitive aspects and certain virtual worlds may allow for competitive activity among users.

As used herein the term "asset for a simulated environment" includes digitally generated avatars, terrain features and objects that are used within the context of the simulated environment. Such assets may be generated from computer instructions and or stored data associated with the simulated environment. Specifically, an avatar refers to a digitally-generated character, vehicle, or other object through which a user interacts with a simulated environment and which may be directly controlled by the user. A terrain feature refers to an asset that the user does not directly control. The interaction between a terrain feature and other assets of the simulated environment are principally determined by the rules of the simulated physics. Terrain features may obey rules governing simulation of solid, liquid or gaseous objects. Other objects with which a user may interact within the simulated environment may also be regarded as assets of the simulated environment. Examples of such objects include, but are not limited to, weapons, tools, and communication devices that may be associated with an avatar, simulated economic assets such as currency and treasure, computer-generated characters that are not controlled by any user and transportation assets that facilitate travel between different parts of the simulated environment.

As used herein, the term "interactive entertainment" application refers to a computer-implemented application that is used primarily for a user's entertainment.

FIG. 1 depicts an example of a system 100 configured to facilitate interaction with a simulated environment according to an embodiment of the present invention. The system 100 generally comprises a controller 102 having a processor 110 and a memory 120. The processor 110 and memory 120 may be operably coupled to each other, e.g., by a suitable data bus. The system may optionally include a video display device 104 coupled to the controller 102 and an image capture device 106 coupled to the processor 110. The image capture device may be any device capable of capture a digital image of an object. Examples of image capture devices include, but are not limited to, digital cameras and image scanners. The image capture device 106 may be coupled directly to the processor 110, e.g., by a direct data bus connection. Alternatively, the image capture device 106 may be indirectly coupled to the processor 110, e.g., via exchange of data with the memory 120. The video display device 104 may be any device capable of displaying visual information in response to a signal from the controller 102, including cathode ray tube (CRT), liquid crystal display (LCD), plasma, and light-emitting diode (LED) displays.

The system 100 is configured to generate assets for a simulated environment from an image 101 of one or more real objects 105, 107 or a drawn object 107. The image 101 may be obtained with the image capture device 106 or stored as image data 122 in the memory 120. The image data 122 identify brightness, color, contrast and other information associated with pixels that make up the image 101. The video display device 104 may display the image 101. The system 100 operates by automatically tracing an outline of the objects 103, 105, 107 in the digital image 101 to generate data representing two-dimensional polygons 113, 115, 117 that encompass the objects 103, 105, 107. The outline is traced without relying on further input from a user once the digital image 101 has been captured. Portions of the digital image 101 bounded by the two-dimensional polygons 113, 115, 117 may be separated from the rest of the digital image 101. The system 100 may then associate the portion of the image bounded by the two-dimensional polygon with an asset in the simulated environment.

The processor 110 may be programmed with instructions that facilitate such operation. In particular, the processor 110 may be programmed with image capture instructions 112 that obtain an image 101 from the image capture device 106 and store the data 122 representing the image 101 or retrieve the stored image data 122 from some other device. The processor 110 may be further programmed with outlining instructions 114 that analyze the image data 122 to locate edges of the objects 103, 105, 107 in the image 101 and generate data 124 representing the corresponding polygons 113, 115, 117. The polygon data 124 may identify, among other things, locations of endpoints of a plurality of line segments that make up each side of each polygon. The locations of the endpoints within the image 101 may be defined with respect to some coordinate system. An origin of the coordinate system may be arbitrarily defined and each location may be identified in terms of a number of pixels horizontally and vertically between the endpoint and the origin.

The processor 110 may be further programmed with asset generation instructions 116 that separate the portions of the image 101 surrounded by the polygons from the rest of the image and associate those portions with corresponding assets of the simulated environment.

Figure 2:
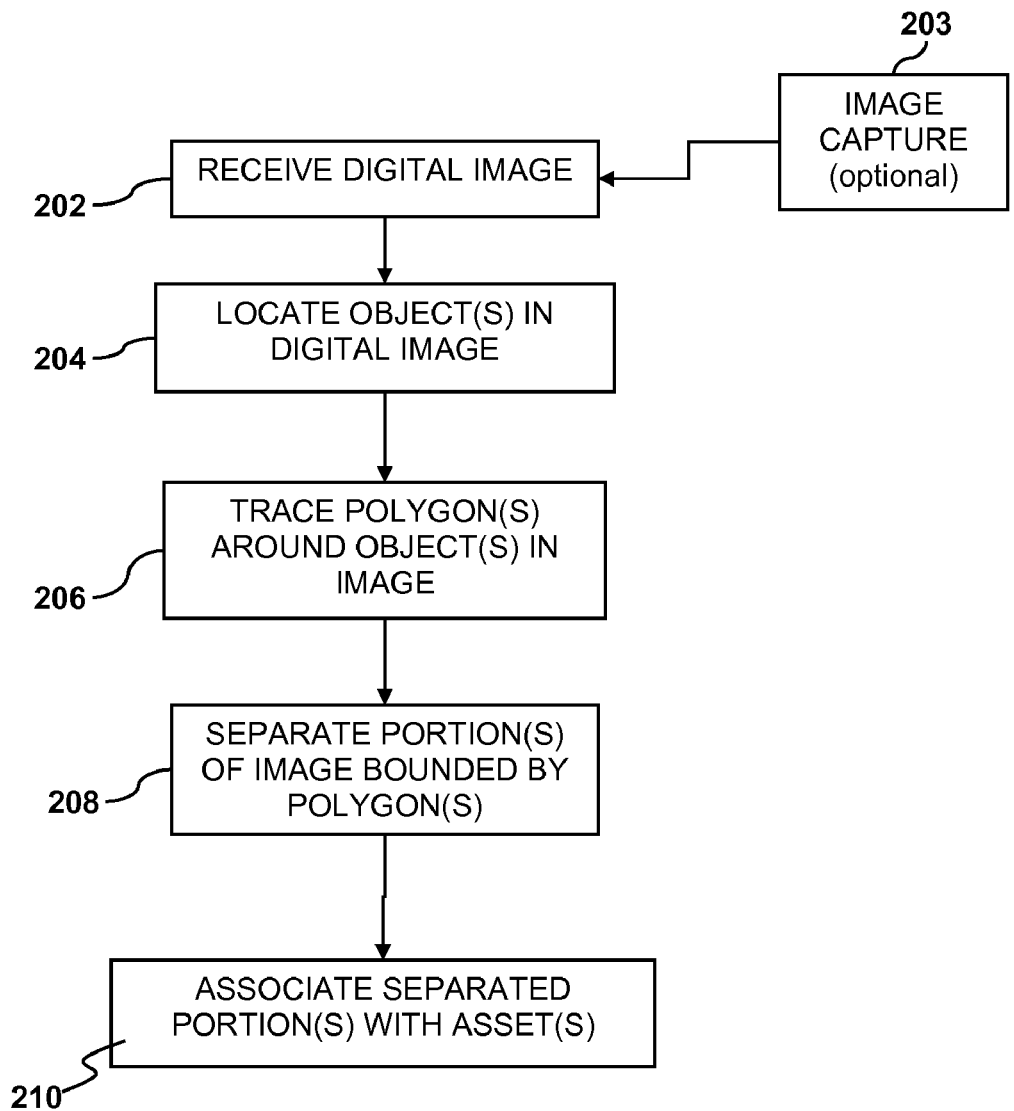
FIG. 2 is a flow diagram depicting an example of generating an asset for a simulated environment according to an embodiment of the present invention.

Operation of the system depicted in FIG. 1 may be understood by referring to the flow diagram of FIG. 2 and FIGS. 3A-3C. The flow diagram shown in FIG. 2 illustrates a method 200 for generating an asset for a simulated environment using a system of the type shown in FIG. 1. The method 200 begins with receiving image data 122 as indicated at 202. The image data 122 represents an image 101 in a digital data format that is readable by the processor 110. The image data 122 format may be any suitable image format such as bitmap, MPEG, JPEG, Tagged Image File Format (TIFF), portable document format (PDF) and the like. The image data 122 may be obtained from the image capture device 106 during a separate image capture process 203. Alternatively, the image data 122 may be retrieved from a data file received from some remote source without having to use the image capture device 106.

Figure 3A:
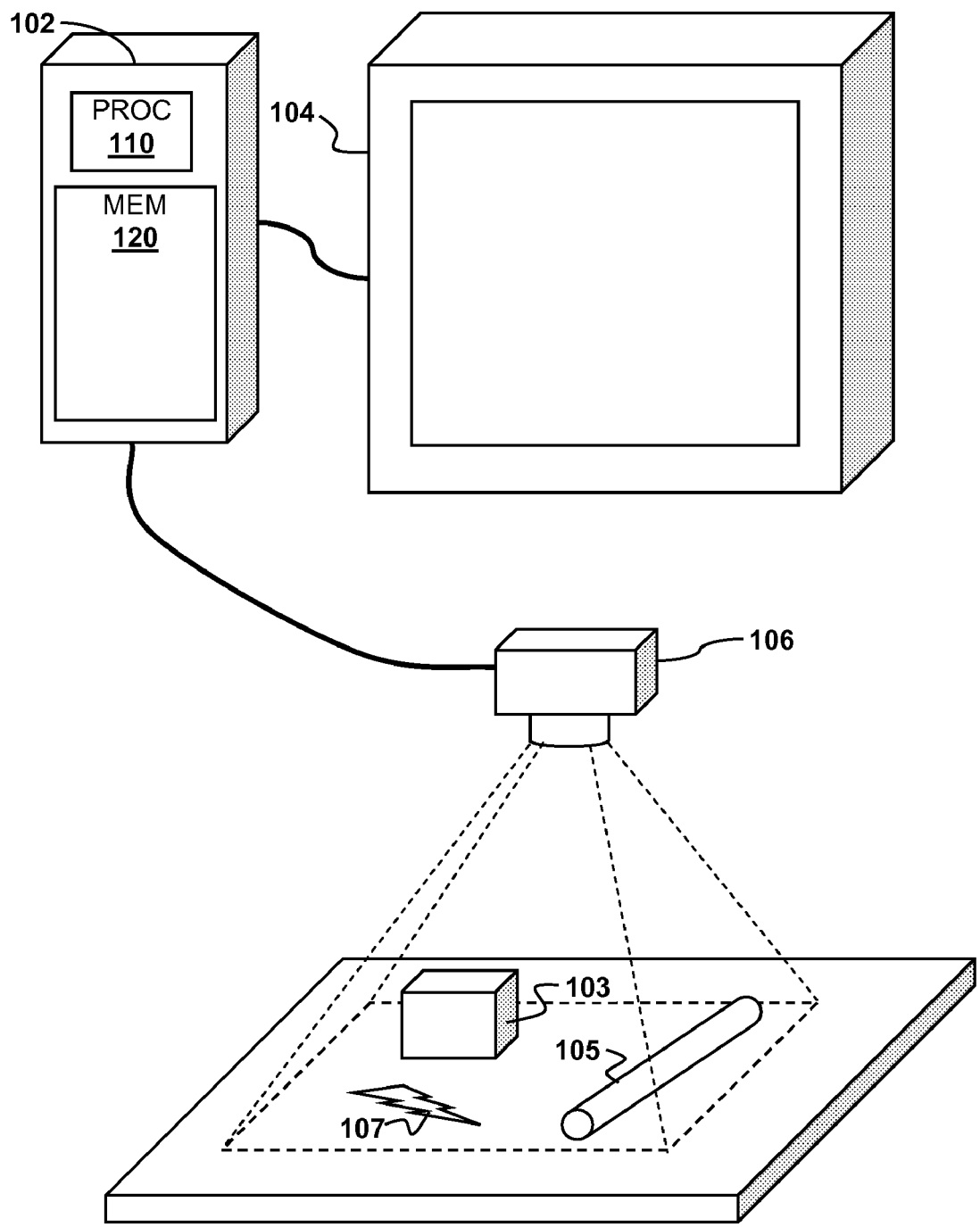
FIGS. 3A-3C are a series of three-dimensional diagram illustrating an example of generating an asset for a simulated environment system according to an embodiment of the present invention.
Figure 3B:
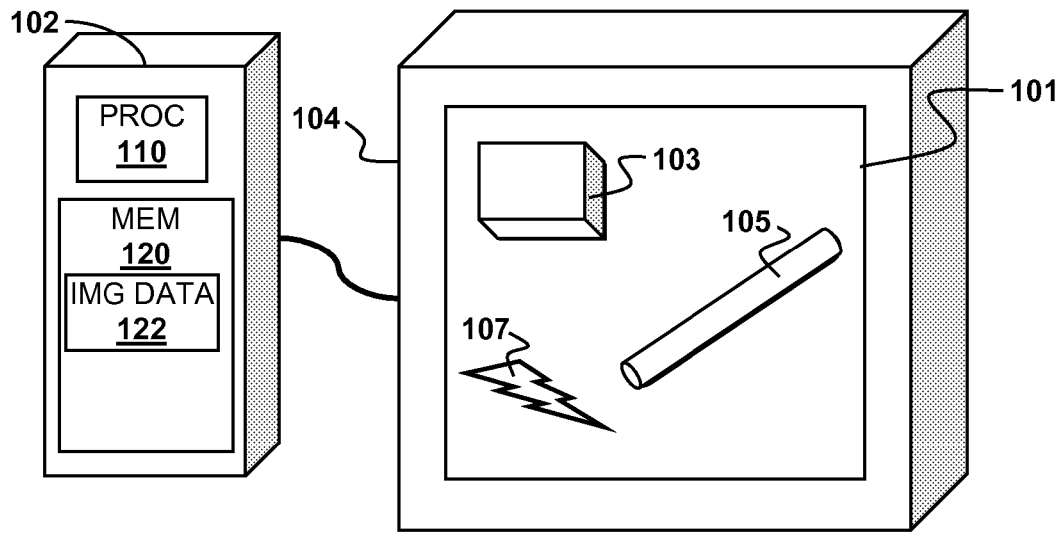

An advantage of using the image capture device 106 to generate the image 101 is that a user has almost unlimited possibilities for the objects that may be placed in the image 101. Specifically, referring to FIG. 3A, the image capturer device may generate the image 101 using real objects such as a cube 103 and a cylinder 105. In addition, the image 101 may be generated using hand-drawn objects such as the lightning bolt 107. Objects such as the lightning bolt 107 may be drawn freehand on regular paper using an ordinary pen, pencil or marker. These objects may appear in the image 101 presented on the video display device as shown in FIG. 3B. Once the image 101 has been captured and stored in memory as image data 122 individual objects within the image may be located, as indicated at 204. There are a number of conventional image analysis techniques that may be employed to locate the individual objects 103, 105, 107 in the image 101. For example a boundary of the object may be determined by analyzing the image data 122 for changes in contrast that are characteristic of an edge or boundary of an object. Contrast may be defined as a difference in grayscale brightness between neighboring pixels of an image. More complicated shapes may be identified by edge detection. There are a number of commercially available image analysis software programs that can locate objects within a digital image through contrast analysis or edge detection. For example, certain filtering tools for object location are built into Adobe Photoshop. Adobe Photoshop also has filters for edge detection, which may be used in algorithms for object location. It also has a "magic wand" tool, which can be used for object location. The "magic wand" tool may be used in tandem with edge detection and threshold filtering to achieve effects similar to those described herein. In some embodiments the image 101 may be processed in this way before perform polygonization. In essence, object location and edge detection may be considered a "first pass".

Figure 3C:
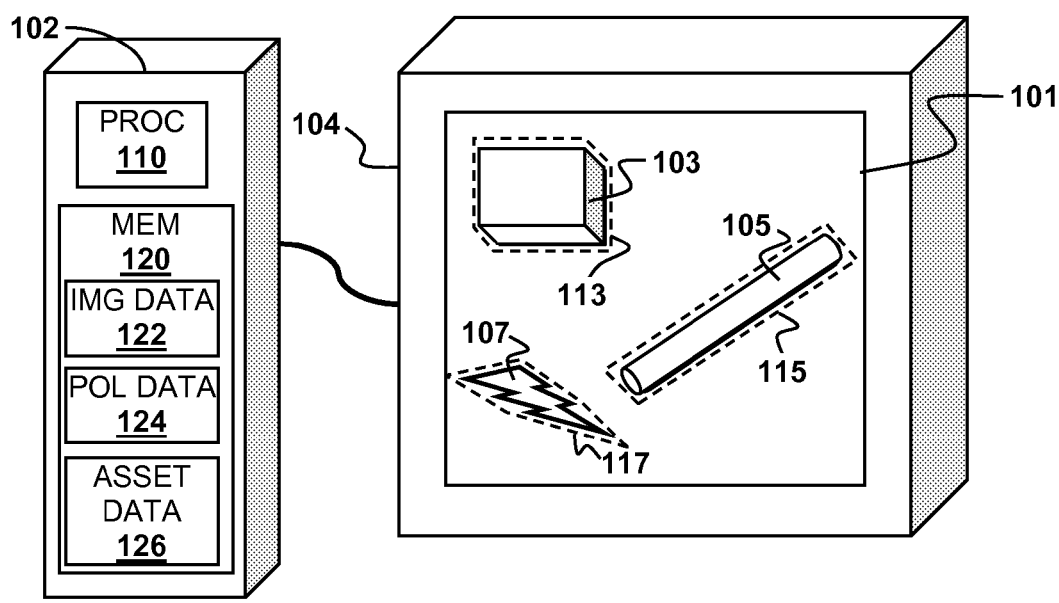
Figure 4A:
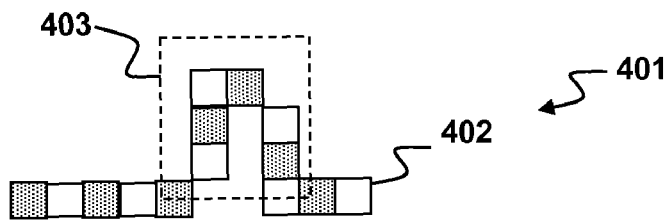
FIGS. 4A-4D are a series of diagrams illustrating an example of a technique for tracing an outline of an object in a digital image.

Once the objects 103, 105, 107 have been located in the image 101, Polygons 113, 115, 117 may be traced around each object, as indicated at 206 and as illustrated in FIG. 3C. Polygon data 124 may be stored in the memory 120. There are a number of different techniques for tracing the polygons. FIGS. 4A-4D illustrate an example of one such technique. As shown in FIG. 4A, a plurality of boundary points 402 may be associated with an object 401. Each boundary point may be a pixel at an edge or boundary of the object 401, identified from contrast analysis or edge detection performed on the image data 122. The boundary points may be placed at regular intervals of distance along edges of the object 401. It is noted that the number of boundary points will depend partly on the size of the object 401 and partly on the complexity of its boundary. If each boundary point 402 were to be used as an endpoint, the resulting polygon may have a large number of edges. A large number of edges may require additional processing time and resources. It would be desirable to use a relatively few line segments for the long straight edges and somewhat more line segments for the sharp corners.

To optimize the number of line segments in the polygon surrounding the object 401, the outline instructions 114 may be configured to implement the following procedure. First, second and third boundary adjacent points may be located within the image data. An angle between a first line segment connecting the first and second boundary points and a second line segment connecting the first and third points may be determined. If the angle is less than a threshold value, establishing the third line segment may be associated with a side of the polygon. If the angle is greater than the threshold value, the first line segment may be associated with first side of the polygon and associating the second line segment may be associated with a second side of the polygon adjacent the first side.

Figure 4B:
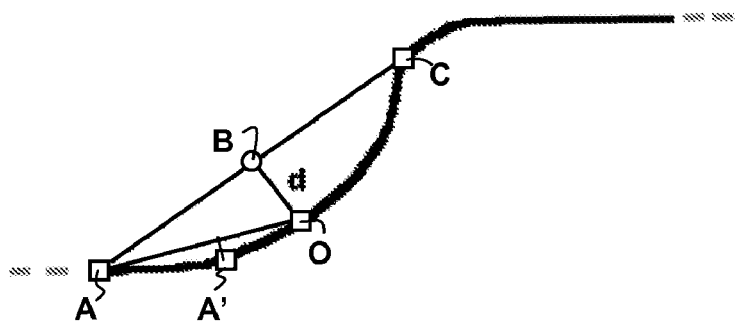
Figure 4C:
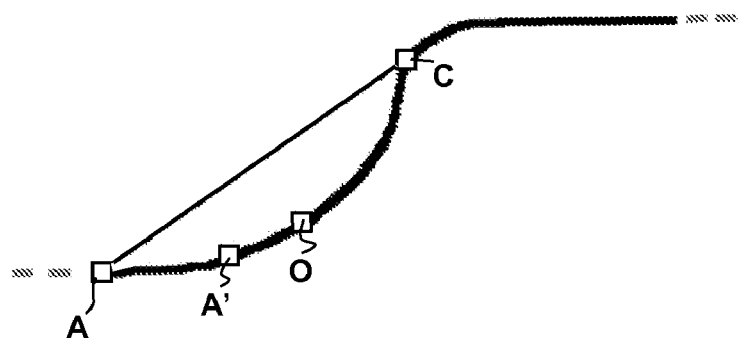

As shown in FIGS. 4A-4C, the polygonization algorithm used at 206 in FIG. 2, may march along the boundary of an object 401, eliminating some of the boundary pixels 402 and connect the remaining boundary pixels with line segments. In FIG. 4A alternating pixel shading has been used to make adjacent pixels easier to distinguish. In reality the boundary pixels 402 may all be of one color value. By way of example, the polygonization march may occur on a per pixel basis. The bend in the boundary of the object 401, in terms of angle, is quite sharp both coming in and out of a cusp 403 (moving along the boundary of the object 401 from left to right). In practice, when marching per pixel it may only be possible to move at angles 45 degrees or 90 degrees. Yet a small number of pixels in a cusp, e.g., 3 pixels of cusp may be ignored. Thus, the boundary pixel elimination may be determined according to a distance criterion, but to eliminate cusps it is desirable to work on a local scale. So what really needs to happen is a linear fit local to some part of the boundary pixels 402.

By way of example, the algorithm may start with a vertex boundary pixel and connect that vertex pixel with other boundary pixels by line segments one by one. For each line segment, a perpendicular distance d is computed between the line segment and each boundary pixels that had previously been connected to the vertex pixel by another line segment. If the perpendicular distance d from each previously connected pixel is less than some threshold distance that pixel may be ignored as a potential vertex. If the perpendicular distance d is greater than or equal to the threshold distance for a given pixel that had previously been connected to pixel A by a line segment) is too far away from the current linear fit. FIGS. 4B-4C provide an illustration of the principle behind obtaining a segment in the polygonization. Every boundary pixel before pixel A that is on the left in FIG. 4B has been handled by the polygonization algorithm. For example, as shown in FIG. 4B, the perpendicular distances between pixel A' and the line segment AO between pixels A and O is less than some threshold distance d. Thus, pixel A' may be disregarded as a potential vertex. Perpendicular distances may be calculated between line segment AO and each intermediate pixel between pixel A and pixel O. If none of these perpendicular distances is greater than the threshold, these pixels may be discarded as potential vertices.

Note that this process proceeds after it reaches pixel O, but does not identify pixel O as a vertex at that point, because no pixel between pixel A and pixel O is greater than the threshold perpendicular distance d from the line segment AO. However, once the process reaches pixel C, the pixel O is now a distance 'd' away from the line segment AC formed from the end of the current polygonization (the vertex located on top of the pixel A) and the "point in question" (pixel C, which may be interpreted as a potential vertex). At this point, a vertex may be added at pixel C, and the other pixels between A and C may be cleared as potential vertices. The process may repeat again until the object has been completely outlined with a polygon.

Figure 4D:
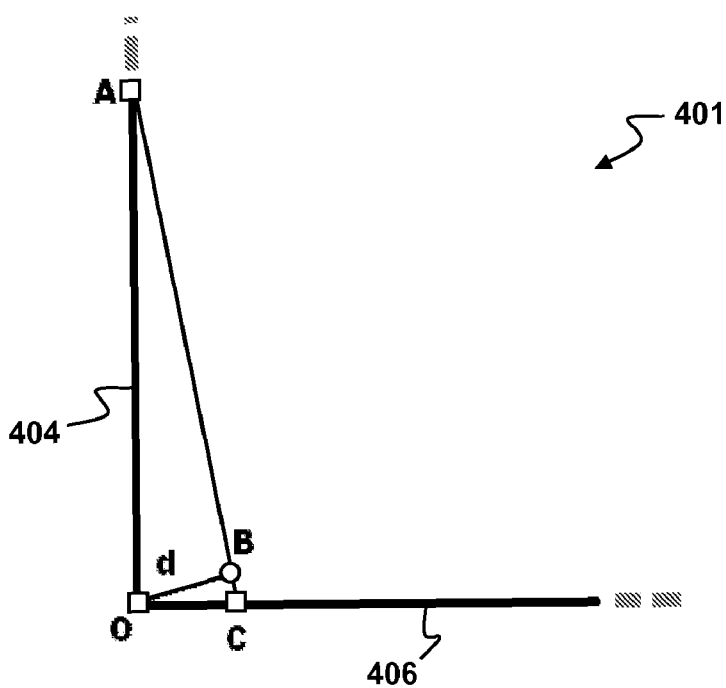

In some embodiments, the polygonizing algorithm may take into account an angle between adjacent segments. Consider an object 401 having sharp square corner, e.g., as shown in FIG. 4D. In this scenario, it would be desirable to outline the object 401 with a polygon that follows the square corner of the object 401 having perpendicular sides 404, 406. Preferably, the polygonization algorithm would include place vertices at pixel A, pixel O, and some other pixel along the bottom side 406, e.g., pixel C. It is noted that pixel C may be added, but it is technically unnecessary in this example because side 406 follows a straight line after pixel O. Thus, adding pixel C as a vertex may be redundant.

However, if the proposed algorithm described above with respect to FIG. 4B were applied to the object 401 shown in FIG. 4C, only pixel A and pixel C would be identified as vertices, since pixel O, located at the corner, would be considered unneeded (as in the previous example). However, including pixel O as a vertex may be aesthetically desirable. Mostly, this is because people are ok with smooth shapes becoming angled (since we are, technically losing precision in both cases) but it is not pleasing to see a skewed box.

In summary, angle detection is good at picking up uniform and well behaved shapes. If you drew polygons, for example, angle detection would work great because the algorithm expects straight segments and is sensitive to turning. However, angle detection is poor at eliminating jaggy features such as those shown in FIG. 4A, which may be present in user generated content, e.g., because people often don't draw quite straight).

Thus, the polygonization may involve a hybrid of distance detection, as described above with respect to FIG. 4B and angle detection. Specifically, after the offending point O has triggered a break (new vertex) in the polygon based on distance, a check may be performed on the ratio of lengths AC/OB in the formed triangle. If this ratio is less than some predetermined threshold the offending point O may be added to the polygonization as a vertex. By way of example a threshold value of about 2 has been found to work well from empirical testing.

In some cases it may be desirable to remove the vertex at pixel C from the polygonization, if it is not needed. This may not be necessary, because it tends to be a rare and non-damaging case. However, for the sake of a reducing the number of vertices in the polygonization a second pass on the entire completed polygonization may be performed, eliminating points using the same ratio test, but with a much stricter ratio scale (e.g., a factor of 7 or 10), otherwise the entire polygon 401 would get "straightened" and features may be lost.

After the polygons have been traced around each object in the image 101, the portions of the image that are encompassed by the polygons 113, 115, 117 may be separated from the image as indicated at 208 in FIG. 2. By way of example, the portions of the image 101 encompassed by the polygons 113, 115, 117 may be stored in the memory 120 as asset data 126.

Figure 5A:
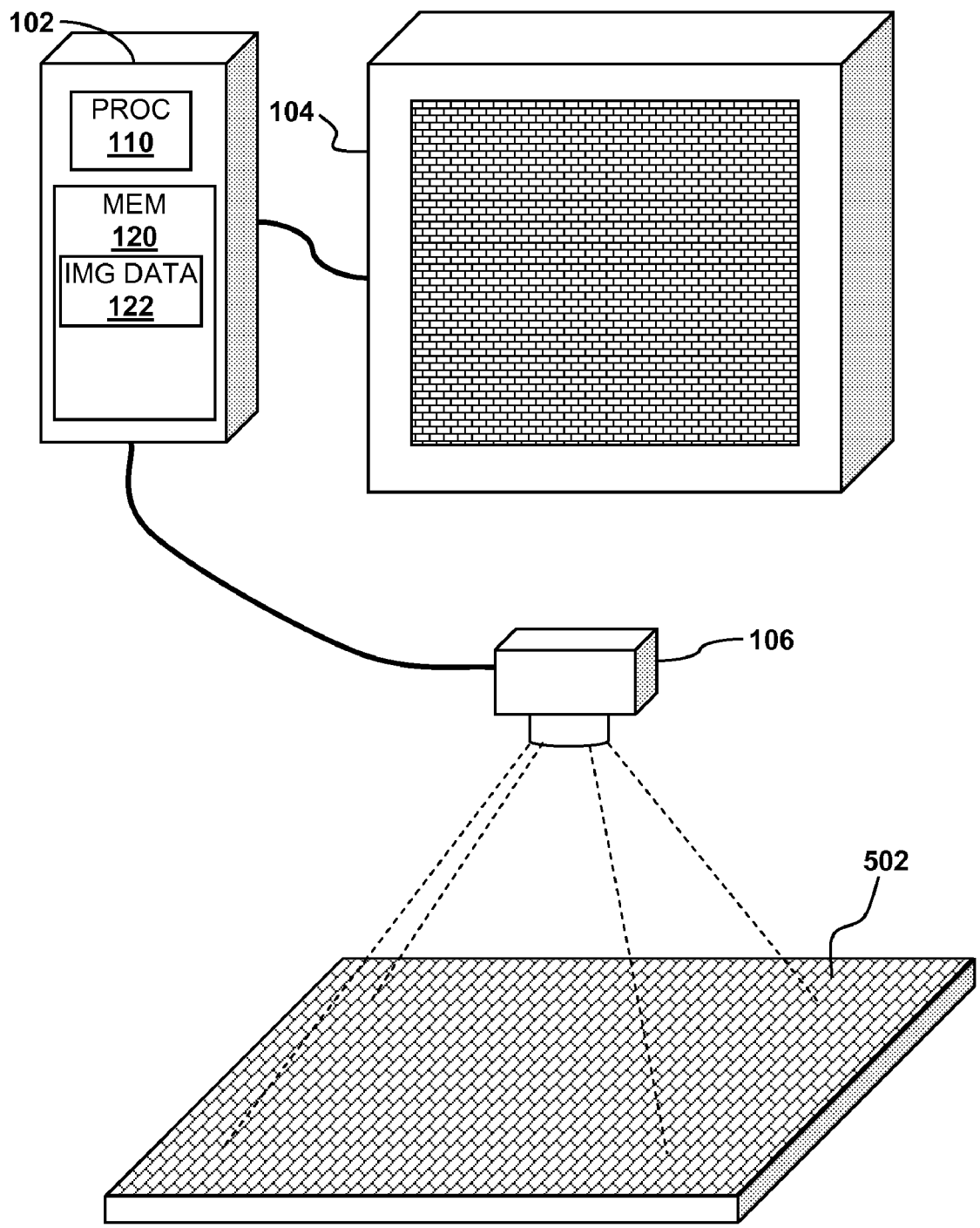
FIGS. 5A-5D are a series of three-dimensional diagram illustrating an example of generating an asset for a simulated environment system according to an alternative embodiment of the present invention.
Figure 5B:
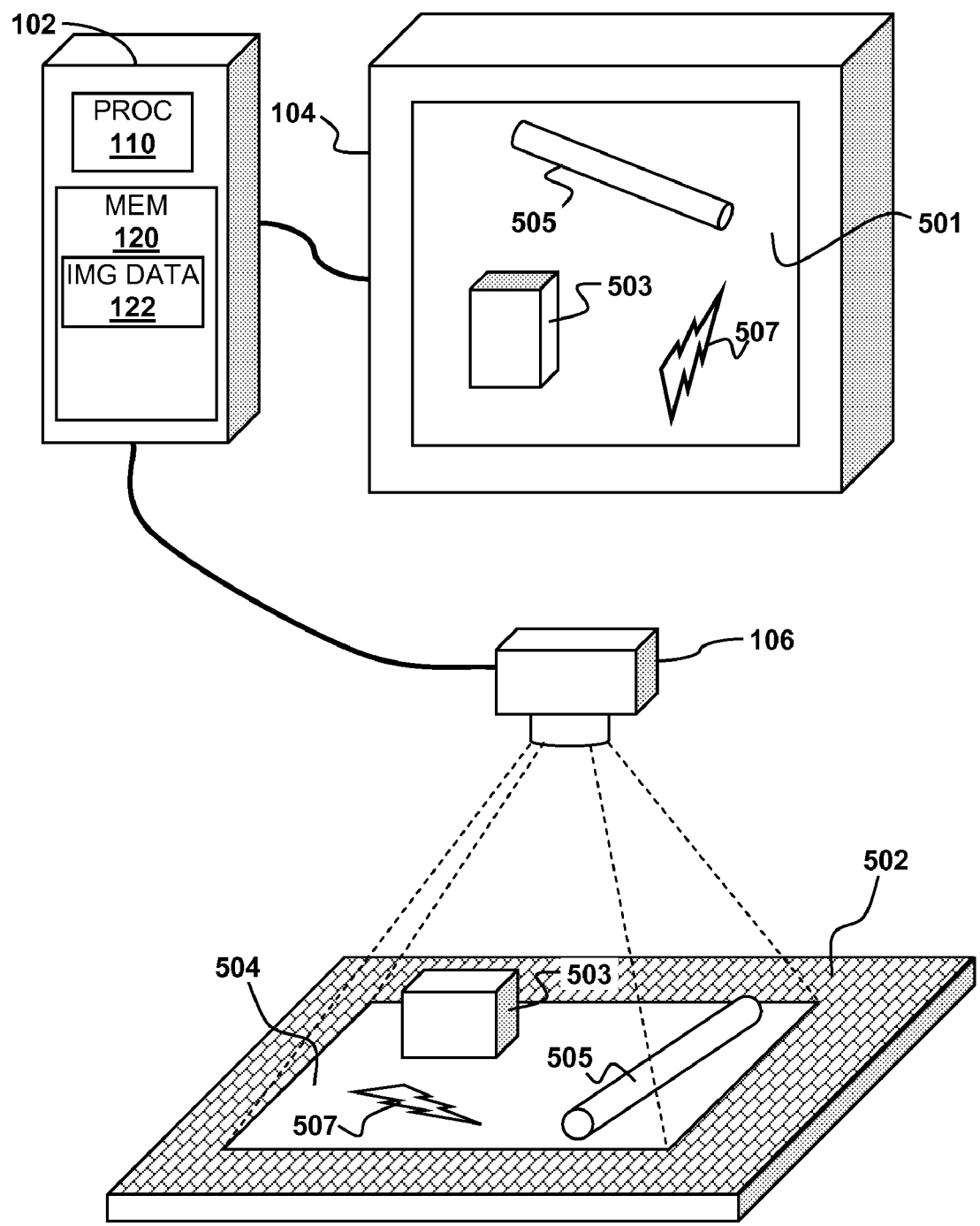
Figure 5C:
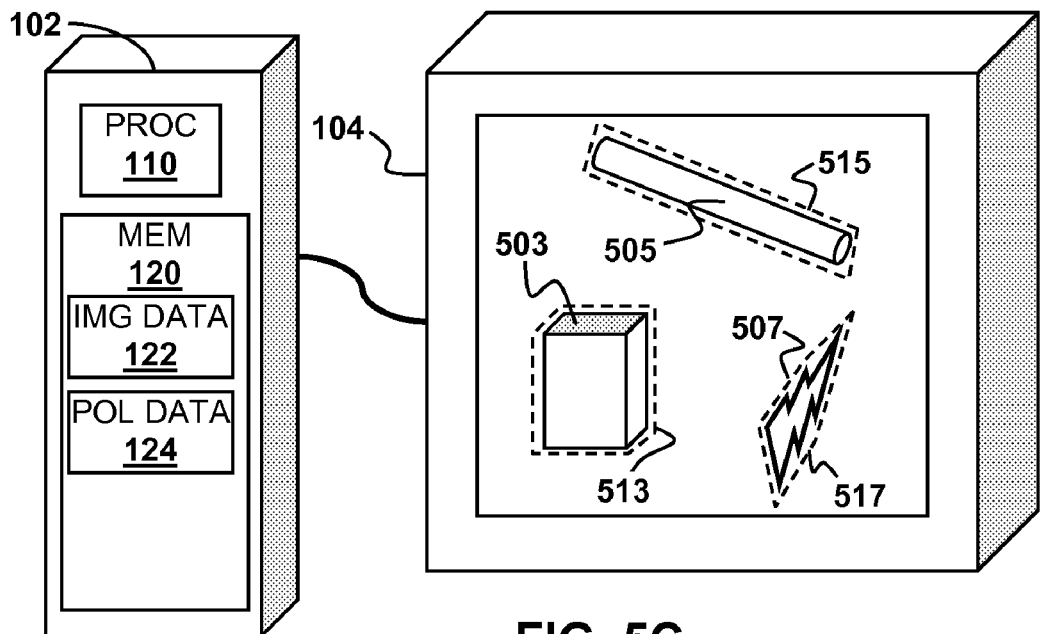
Figure 5D:
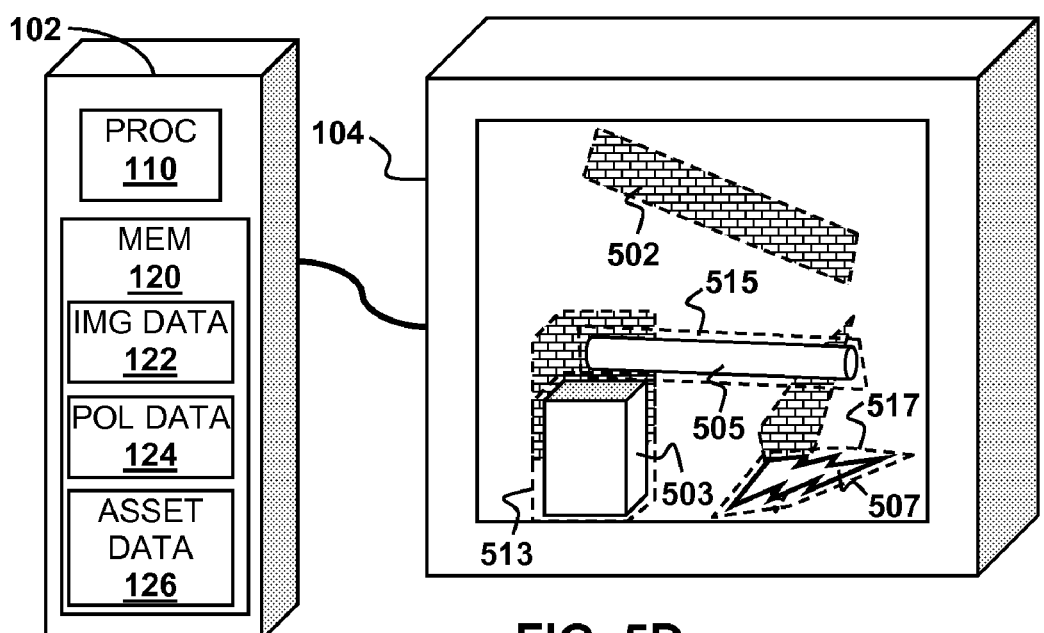

The use of image capture allows for interesting visual effects when separating the portions surrounded by the polygons 113, 115, 117 from the rest of the image 101. For example, FIGS. 5A-5D illustrate an example of how a background may be included in the creation of an asset. Specifically, as shown in FIG. 5A a digital image of a patterned background 502 may be captured by the image capture device 106 and stored as part of the image data 122. Objects 503, 505, 507 may be placed and/or drawn on a plain background 504, such as a piece of paper and an image 501 containing the objects may be captured and stored as part of the image data 122 as shown in FIG. 5B. Data representing polygons 513, 515, 517 surrounding the objects 503, 505 and 507 respectively may then be generated as described above and stored as polygon data 124 as shown in FIG. 5C. The polygons 513, 515, 517 containing the objects 503, 505 and 507 may then be separated from the plain background 504 and the spaces formerly occupied by the objects may be filled with corresponding portions of the patterned background 502 as shown in FIG. 5D.

The separated portions may then be associated with assets for a simulated environment as indicated at 210. There are a number of different ways in which the asset data 126 may be associated with an asset. Associating the separated portions with assets may involve associating simulated physics properties with separated portion. Simulated physics properties may include mobility (e.g., whether the asset is fixed or mobile), boundary collision properties (e.g., whether the asset can interpenetrate other assets), as well as size, weight, mass and other physical properties. In addition, a pivot point may be associated with an object. For example, a centroid (e.g., center of mass or equivalent) may be calculated for an object and used as a pivot point for rotating the object.

Figure 6A:
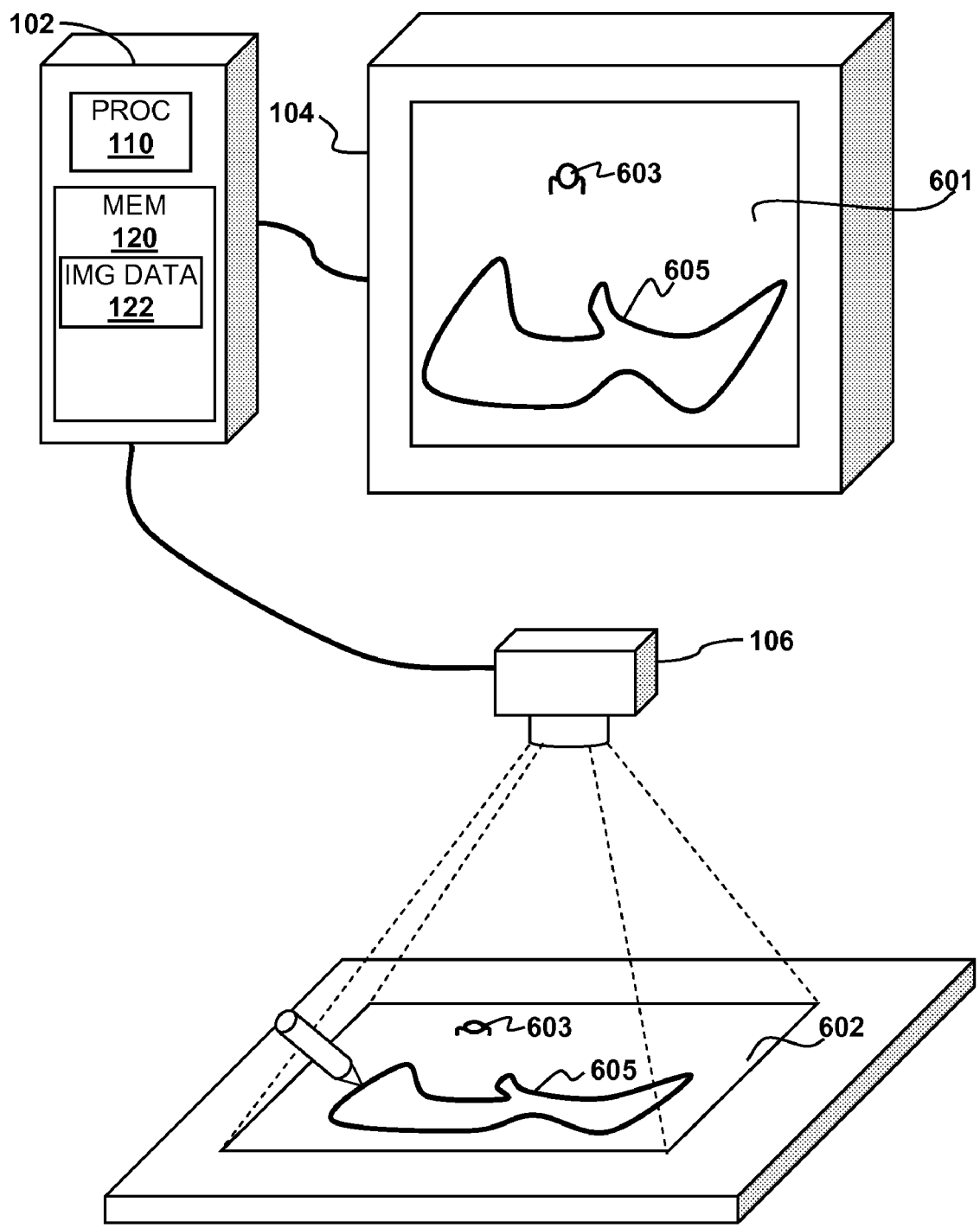
FIGS. 6A-6B are a series of three-dimensional diagram illustrating an example of generating an asset for a simulated environment system according to an alternative embodiment of the present invention.
Figure 6B:
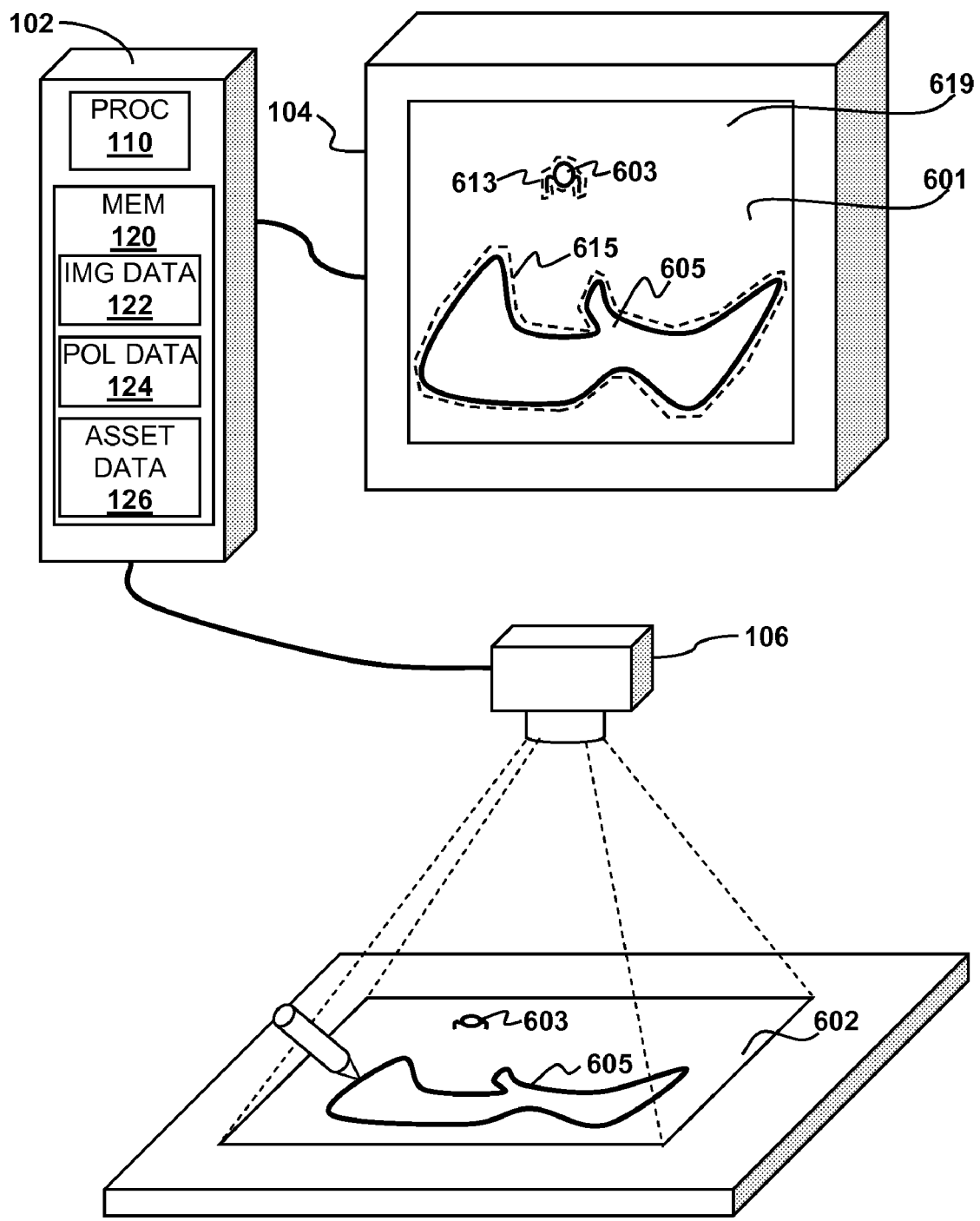

Embodiments of the present invention also allow the controller 102 to automatically generate different types of game assets from a single image. For example, in some video game applications it may be desirable to generate both an avatar and terrain features as illustrated in FIGS. 6A-6B. As shown in FIG. 6A a user may draw two or more objects 603, 605 on a plain background 602, such as a sheet of paper. The digital image capture device 106 may capture a digital image 601 of these objects. The image 601 may be stored in the memory 120 as part of the image data 122. Using the techniques described above, data 124 representing polygons 613, 615 that surround the objects 603, 605 may be generated, as shown in FIG. 6B. The portions of the digital image 601 bounded by the polygons 613, 615 may be separated from the rest of the digital image 601. These portions may be stored as asset data 126. One portion may be used as an avatar in an interactive entertainment program and using the other portion may be used as a terrain feature in the interactive environment.

There are a number of different ways to determine which portion is to be used as an avatar and which portion to use as a terrain feature. By way of example, and without loss of generality, this determination may be based on a relative size of two objects in the image. Specifically, a first object 603 may be smaller than a second object 605. The relative sizes may be determined from areas of the corresponding polygons 613, 615. By way of example, the larger polygon 615 may be associated with a terrain feature and a smaller polygon 613 may be associated with an avatar. Alternatively, the determination may be based on the relative locations of the polygons 613, 615. For example, a polygon 613 closest to a top 619 of the image 601 may be associated with an avatar. Any other polygon 615 may be associated with a terrain feature.

Figure 7A:
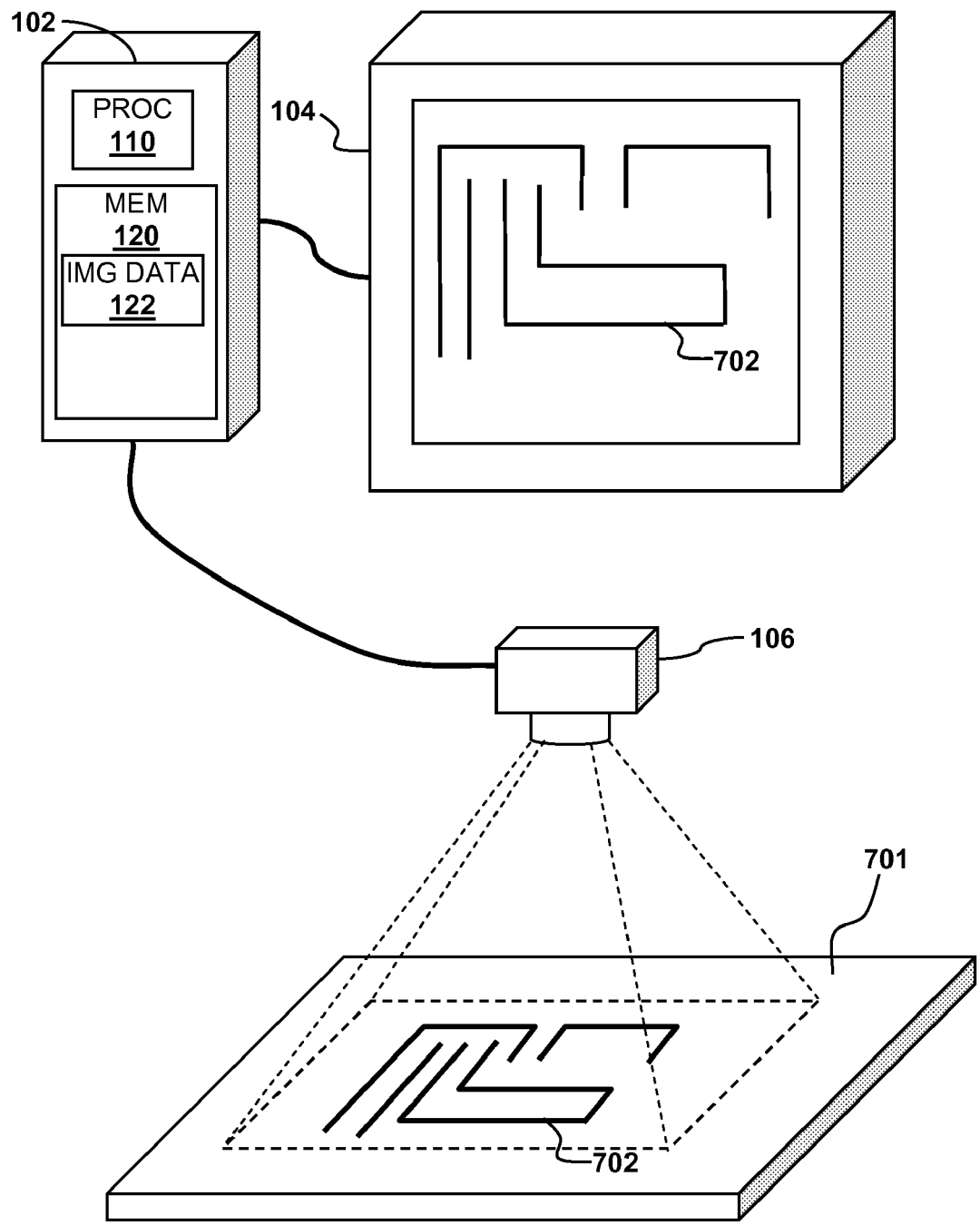
FIGS. 7A-7C are a series of three-dimensional diagram illustrating an example of generating a three-dimensional asset for a simulated environment system according to an alternative embodiment of the present invention.
Figure 7B:
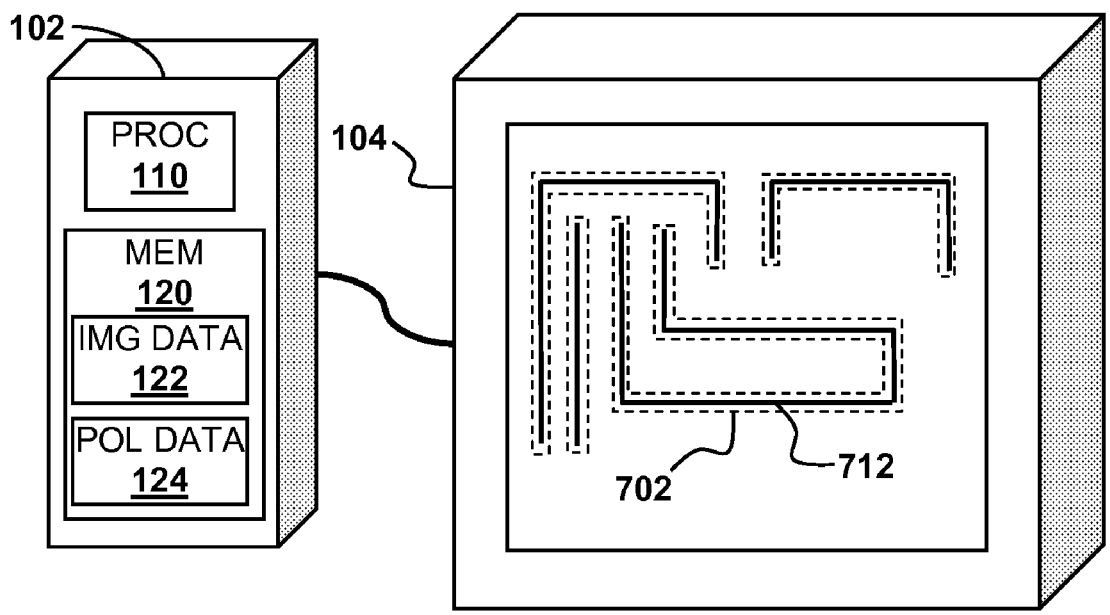
Figure 7C:
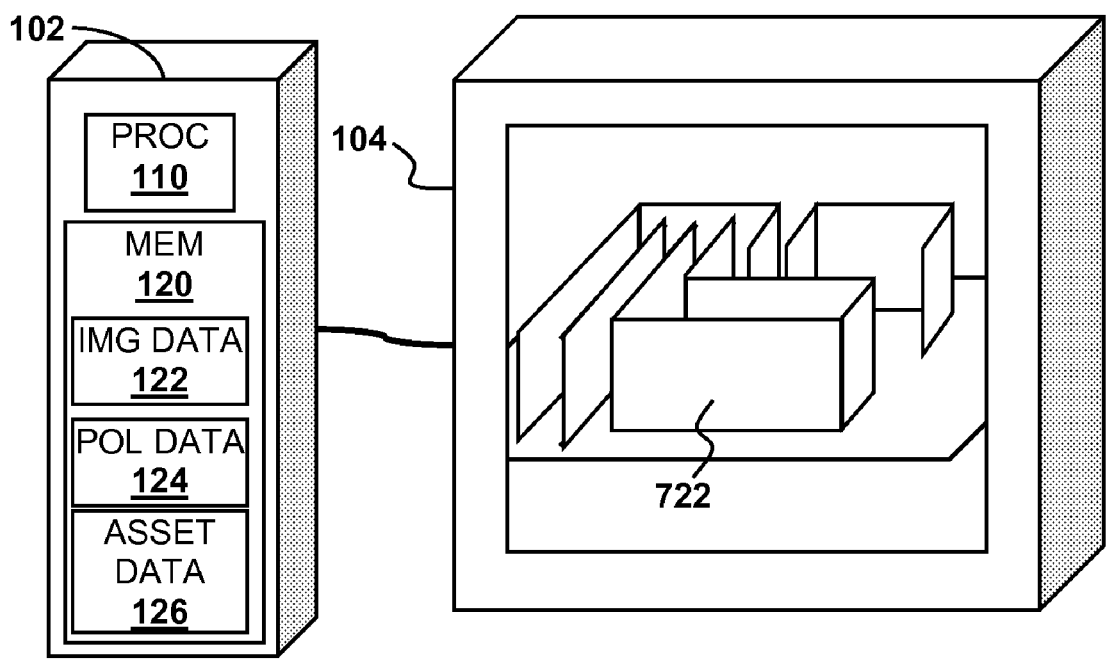

Although the preceding examples illustrate generation of two-dimensional assets, embodiments of the present invention are not limited to generation of such assets. Embodiments of the present invention may also be employed to generate three-dimensional assets from two-dimensional images. FIGS. 7A-7C illustrate one example, among others of such three-dimensional asset generation. Specifically, as shown in FIG. 7A, a two-dimensional pattern 702 may be drawn on a plain background 701, such as a sheet of paper. The image may be stored as image data 122. Using the techniques described above, data 124 representing polygons 712 that surround various portions of the two-dimensional pattern 702 may then be generated as shown in FIG. 7B. The polygons 712 may then be projected into three-dimensional shapes 722 as shown in FIG. 7C. The projection of the polygons 712 into three-dimensional shapes 722 may be accomplished through appropriate manipulation of the polygon data 124 to form three-dimensional asset data 126. In the example depicted in FIG. 7C, the projection is a simple cylindrical projection of the two-dimensional polygons 712 along an axis perpendicular to the plane of the polygons.

Using techniques such as those depicted in FIGS. 7A-7C, a user may draw a maze pattern on an ordinary sheet of paper and capture the maze pattern with the image capture device 106 The controller 102 may then generate a three-dimensional maze for use in a video game or simulated environment.

Figure 8:
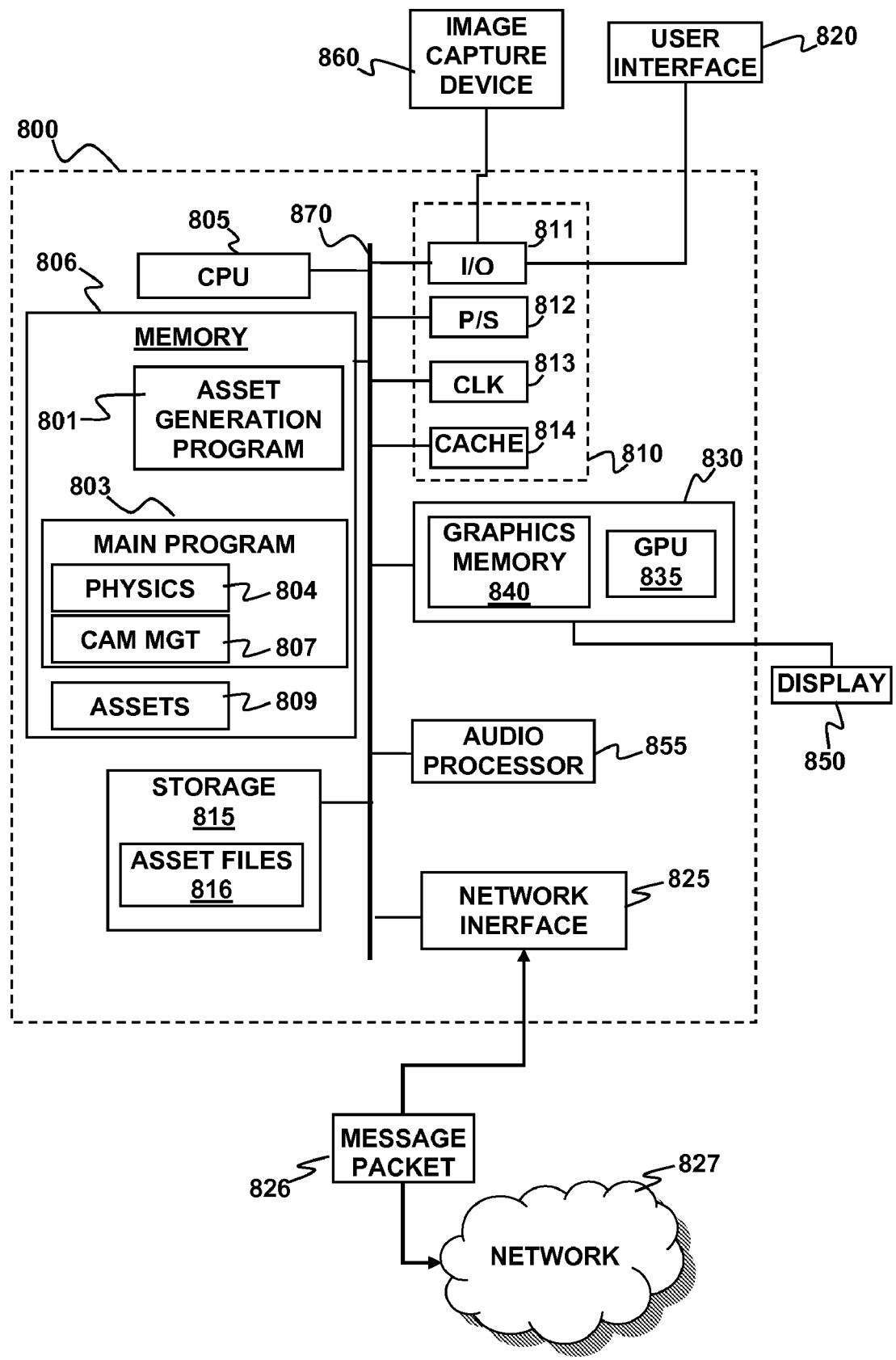
FIG. 8 is a block diagram illustrating an example of a client device according to an embodiment of the present invention.

By way of example, the system 100 described above may be implemented using an apparatus 800 as shown in FIG. 8 according to an embodiment of the present invention. By way of example, and without loss of generality, the apparatus 800 may be implemented as a computer system, such as a personal computer, video game console, personal digital assistant, or other digital device, suitable for practicing an embodiment of the invention. The apparatus 800 may include a central processing unit (CPU) 805 configured to run software applications and optionally an operating system. The CPU 805 may include one or more processing cores. By way of example and without limitation, the CPU 805 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

A memory 806 is coupled to the CPU 805. The memory 806 may store applications and data for use by the CPU 805. The memory 806 may be in the form of an integrated circuit, e.g., RAM, DRAM, ROM, and the like). A computer program 801 may be stored in the memory 806 in the form of instructions that can be executed on the processor 805. The instructions of the program 801 may be configured to implement, amongst other things, certain steps of a method for generating an asset for the simulated environment, e.g., as described above with respect to FIG. 1 through FIG. 7C. By way of example, the impression enhancement program 801 may include instructions to a) automatically digitally trace an outline of an object in a digital image to generate data representing a two-dimensional polygon that encompasses the object without relying on further input from a user to trace the outline; b) separate a portion of an image bounded by the two-dimensional polygon from a remaining portion of the digital image; and c) associate the portion of the image bounded by the two-dimensional polygon with an asset in the simulated environment.

The program 801 may operate in conjunction with one or more instructions configured to implement an interactive environment. By way of example, such instructions may be part of a main simulated environment program 803, such as a video game program. Alternatively, the main program 803 may be a program for interfacing with a virtual world. The main program 803 may be configured to display a scene of a portion of the simulated environment from the camera POV on a video display and change the scene as the camera POV changes in response to movement of the camera POV along a camera path during the user's interaction with the simulated environment. The main program 803 may include instructions for physics simulation 804 and camera management 807. The memory 806 may contain asset data 809 representing various assets, such as avatars, terrain features and other objects used in the simulated environment. The main program 803 may call the asset generation program 801, physics simulation instructions 804, camera management instructions 807 and instructions and/or data relating to assets 809.

The apparatus 800 may also include well-known support functions 810, such as input/output (I/O) elements 811, power supplies (P/S) 812, a clock (CLK) 813 and cache 814. The apparatus 800 may further include a storage device 815 that provides non-volatile storage for applications and data. The storage device 815 may be used for temporary or long-term storage of auxiliary content assets 816, such as advertisements, downloaded from a remote content server (not shown). By way of example, the storage device 815 may be a fixed disk drive, removable disk drive, flash memory device, tape drive, CD-ROM, DVD-ROM, Blu-ray, HD-DVD, UMD, or other optical storage devices.

One or more user input devices 820 may be used to communicate user inputs from one or more users to the apparatus 800. By way of example, one or more of the user input devices 820 may be coupled to the apparatus 800 via the I/O elements 811. Examples of suitable input device 820 include keyboards, mice, joysticks, touch pads, touch screens, light pens, still or video cameras, and/or microphones. The apparatus 800 may include a network interface 825 to facilitate communication via an electronic communications network 827. The network interface 825 may be configured to implement wired or wireless communication over local area networks and wide area networks such as the Internet. The apparatus 800 may send and receive data and/or requests for files via one or more message packets 826 over the network 827.

The apparatus 800 may further comprise a graphics subsystem 830, which may include a graphics processing unit (GPU) 835 and graphics memory 840. The graphics memory 840 may include a display memory (e.g., a frame buffer) used for storing pixel data for each pixel of an output image. The graphics memory 840 may be integrated in the same device as the GPU 835, connected as a separate device with GPU 835, and/or implemented within the memory 806. Pixel data may be provided to the graphics memory 840 directly from the CPU 805. Alternatively, the CPU 805 may provide the GPU 835 with data and/or instructions defining the desired output images, from which the GPU 835 may generate the pixel data of one or more output images. The data and/or instructions defining the desired output images may be stored in memory 810 and/or graphics memory 840. In an embodiment, the GPU 835 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 835 may further include one or more programmable execution units capable of executing shader programs.

The graphics subsystem 830 may periodically output pixel data for an image from the graphics memory 840 to be displayed on a video display device 850. The video display device 850 may be any device capable of displaying visual information in response to a signal from the apparatus 800, including CRT, LCD, plasma, and OLED displays. The computer apparatus 800 may provide the display device 850 with an analog or digital signal. By way of example, the display 850 may include a cathode ray tube (CRT) or flat panel screen that displays text, numerals, graphical symbols or images. In addition, the display 850 may include one or more audio speakers that produce audible or otherwise detectable sounds. To facilitate generation of such sounds, the client device 800 may further include an audio processor 855 adapted to generate analog or digital audio output from instructions and/or data provided by the CPU 805, memory 806, and/or storage 815. An image capture device 860 may be coupled to the apparatus 800 through the I/O functions 811. As discussed above, the image capture device 860 may be a digital camera.

The components of the apparatus 800, including the CPU 805, memory 806, support functions 810, data storage 815, user input devices 820, network interface 825, and audio processor 855 may be operably connected to each other via one or more data buses 870. These components may be implemented in hardware, software or firmware or some combination of two or more of these.

The simplicity of image capture using a device such as a digital camera allows the use of a virtually unlimited variety of everyday objects such as pens, pencils, erasers, cups, toys and the like as a basis for assets in a simulated environment. Even a user with little computer graphics knowledge and little or no artistic ability may quickly and easily generate customized assets using embodiments of the present invention. Furthermore, image capture allows hand-drawn objects to be used as the basis for assets. Thus, customized assets may be quickly generated from drawings made by hand on ordinary paper, chalk board, white board or other drawing surfaces. Furthermore, multiple real or drawn objects may be photographed and each object in the resulting image may be separated out and associated with a different asset in the simulated environment.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a system configured to facilitate interaction with a simulated environment, a computer-implemented method for generating an asset for the simulated environment, the method comprising:
   a) automatically digitally tracing outlines of each of two or more objects in the same single digital image to generate data representing two or more two-dimensional polygon that encompass the objects;
   b) separating first and second portions of the single digital image bounded by the two or more two-dimensional polygons from a remaining portion; and
   c) using the first portion of the image as an avatar in the simulated environment and using the second portion as a terrain feature in the simulated environment by determining which of the first and second portions is closest to a to of the digital image and using that portion as the avatar and determining which of the first and second portions has a smaller two-dimensional area and using that portion as the avatar, whereby the avatar and the terrain feature are created from the same single digital image.

2. The method of claim 1, wherein the simulated environment is a video game.

3. The method of claim 1, wherein the simulated environment is a virtual world.

4. The method of claim 1 wherein the asset is an avatar.

5. The method of claim 1 wherein the asset is a terrain feature of a simulated environment.

6. The method of claim 1, further comprising: capturing a digital image of a background, wherein b) includes filling in interior of the polygon formerly containing the portion of the digital image with a corresponding portion of the background.

7. The method of claim 1 wherein a) includes locating first, second and third points at an edge of the object; determining a perpendicular distance between a line segment between the first and second points and a third point at the edge of the object intermediate the first and second points; and
   if the perpendicular distance is greater than a threshold value, associating the first and second points with vertices of the polygon.

8. The method of claim 7, further comprising, determining a ratio of a distance between the first and second points and the perpendicular distance between the line segment and the third point; and
   if the ratio is greater than a threshold value associating the third point with a vertex of the polygon, wherein a line segment between the first and third points constitutes a first side of the polygon and wherein a line segment between the third and second points constitutes a second side of the polygon adjacent the first side.

9. The method of claim 1, wherein c) includes using the three dimensional shape as a terrain feature in a simulated environment.

10. The method of claim 1, further comprising, before a) taking a photograph and digitizing the photograph to form the digital image.

11. The method of claim 1, further comprising, before a) selecting a portion of a digital photograph as the digital image in response to input commands from a user.

12. The method of claim 1 wherein c) includes determining which of the first and second portions is closest to a top of the digital image and using that portion as the avatar.

13. The method of claim 1 wherein c) includes determining which of the first and second portions is closest to a bottom of the digital image and using that portion as the terrain feature.

14. The method of claim 1, wherein the portion of the image surrounded by the polygon includes a maze pattern and, wherein c) includes using the three-dimensional shape as a three-dimensional maze in the simulated environment.

15. The method of claim 1, wherein separating first and second portions of the single digital image bounded by the two or more two-dimensional polygons from a remaining portion of the digital image includes projecting a portion of the image surrounded by one or more of the two or more two-dimensional polygons along an axis perpendicular to a plane of the two or more polygons into a three-dimensional shape.

16. An apparatus for generating an asset for generating an asset for a simulated environment using digital image capture, comprising:
   a processor;
   a memory coupled to the processor; and
   one or more instructions embodied in memory for execution by the processor, the instructions being configured to implement a method for generating an asset for interactive entertainment, the instructions comprising:
      one or more instructions that, when executed, automatically digitally trace outlines of each of two or more objects in the same single digital image to generate data representing two or more two-dimensional polygons that encompass the objects;
      one or more instructions that, when executed, cause the processor to separate first and second portions of the digital image bounded by the two or more two-dimensional polygons from a remaining portion of the digital image; and
      one or more instructions that, when executed, cause the processor to use the first portion of the image as an avatar in the simulated environment and use the second portion as a terrain feature in the simulated environment by determining which of the first and second portions is closest to a to of the digital image and using that portion as the avatar and determining which of the first and second portions has a smaller two-dimensional area and using that portion as the avatar, whereby the avatar and the terrain feature are created from the same single digital image.

17. The apparatus of claim 16, further comprising a digital image capture device coupled to the processor.

18. The apparatus of claim 17 wherein the digital image capture device is a digital camera.

19. The apparatus of claim 17, wherein the instructions further comprise one or more instructions that, when executed, cause the digital image of the object to be captured with the digital image capture device and cause data representing the digital image to be stored in the memory.

20. The apparatus of claim 16, wherein separating first and second portions of the single digital image bounded by the two or more two-dimensional polygons from a remaining portion of the digital image includes projecting a portion of the image surrounded by one or more of the two or more two-dimensional polygons along an axis perpendicular to a plane of the two or more polygons into a three-dimensional shape.

21. A non-transitory computer-readable medium having embodied therein one or more computer-readable instructions that, when executed, implement a method for generating an asset for a simulated environment using digital image capture in a system having a processor and a memory coupled to the processor, the instructions comprising:

one or more instructions that, when executed, automatically digitally trace outlines of each of two or more objects in the same single digital image to generate data representing two or more two-dimensional polygon that encompass the objects; and one or more instructions that, when executed, cause the processor to use the first portion of the image as an avatar in the simulated environment and use the second portion as a terrain feature in the simulated environment by determining which of the first and second portions is closest to a to of the digital image and using that portion as the avatar and determining which of the first and second portions has a smaller two-dimensional area and using that portion as the avatar, whereby the avatar and the terrain feature are created from the same single digital image.

22. The non-transitory computer-readable medium of claim 21 wherein the instructions further comprise one or more instructions that, when executed, cause the digital image of the object to be captured with a digital image capture device coupled to the processor and cause data representing the digital image to be stored in the memory.

23. The non-transitory computer-readable medium of claim 21, wherein separating first and second portions of the single digital image bounded by the two or more two-dimensional polygons from a remaining portion of the digital image includes projecting a portion of the image surrounded by one or more of the two or more two-dimensional polygons along an axis perpendicular to a plane of the two or more polygons into a three-dimensional shape.

* * * * *